United States Patent
Soundararajan

(10) Patent No.: US 10,542,481 B2
(45) Date of Patent: Jan. 21, 2020

(54) ACCESS POINT BEAMFORMING FOR WIRELESS DEVICE

(71) Applicant: Aruba Networks, Inc., Sunnyvale, CA (US)

(72) Inventor: Abilash Soundararajan, Bangalore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/878,916

(22) Filed: Jan. 24, 2018

(65) Prior Publication Data
US 2019/0059042 A1     Feb. 21, 2019

(30) Foreign Application Priority Data
Aug. 16, 2017    (IN) ............................. 201741029094

(51) Int. Cl.
| | | |
|---|---|---|
| H04W 12/06 | (2009.01) | |
| H04W 4/40 | (2018.01) | |
| H04B 17/318 | (2015.01) | |
| H04W 48/04 | (2009.01) | |
| G01S 3/14 | (2006.01) | |

(52) U.S. Cl.
CPC .......... *H04W 48/04* (2013.01); *H04B 17/318* (2015.01); *H04W 4/40* (2018.02); *H04W 12/06* (2013.01); *G01S 3/14* (2013.01)

(58) Field of Classification Search
CPC ....... H04W 12/06; H04W 4/40; H04B 17/318
See application file for complete search history.

(56) References Cited

U.S. PATENT DOCUMENTS

| | | | | |
|---|---|---|---|---|
| 9,253,592 | B1* | 2/2016 | Moscovich | H04W 4/80 |
| 2008/0174423 | A1* | 7/2008 | Breed | B60N 2/002 |
| | | | | 340/539.22 |
| 2008/0274713 | A1* | 11/2008 | Rofougaran | G01C 21/165 |
| | | | | 455/334 |
| 2008/0311957 | A1* | 12/2008 | Jantunen | H04W 8/005 |
| | | | | 455/560 |
| 2014/0113591 | A1 | 4/2014 | Takai et al. | |
| 2015/0092676 | A1* | 4/2015 | Periyalwar | H04W 4/029 |
| | | | | 370/329 |

(Continued)

OTHER PUBLICATIONS

Curiac, D-L. et al.; "Wireless Sensor Network Security Enhancement Using Directional Antennas: State of the Art and Research Challenges"; Apr. 2016; 15 pages.

Primary Examiner — Asghar H Bilgrami
(74) Attorney, Agent, or Firm — Hewlett Packard Enterprise Patent Department

(57) ABSTRACT

In some examples a method includes receiving, with an Access Point (AP), a request from a wireless device to access a network through the AP; determining, with the AP via beamforming of a fixed antenna array of the AP, whether an angle of the wireless device relative to the fixed antenna array is within a first predetermined range; determining, with the AP, whether a received signal strength between the AP and the wireless device is within a second predetermined range; and granting, with the AP, the wireless device access to a network through the AP when it is determined that the angle of the wireless device relative to the fixed antenna array is within the first predetermined range and the received signal strength is within the second predetermined range.

18 Claims, 9 Drawing Sheets

(56) References Cited

U.S. PATENT DOCUMENTS

| | | | |
|---|---|---|---|
| 2015/0215762 A1 | 7/2015 | Edge | |
| 2016/0027226 A1* | 1/2016 | Gigl | G07C 9/00111 |
| | | | 340/5.61 |
| 2016/0065572 A1* | 3/2016 | Kim | H04L 63/0861 |
| | | | 726/7 |
| 2016/0323257 A1* | 11/2016 | Kang | H04L 63/08 |
| 2017/0302374 A1* | 10/2017 | Shatz | H04B 10/114 |
| 2018/0160022 A1* | 6/2018 | Oshima | H04N 5/23245 |

\* cited by examiner

| Size of V ($Nr \times Nc$) | Number of angles ($Na$) | The order of angles in the Compressed Beamforming Feedback Matrix subfield |
|---|---|---|
| $2 \times 1$ | 2 | $\phi 11, \psi 21$ |
| $2 \times 2$ | 2 | $\phi 11, \psi 21$ |

| Quantized $\psi$ | Quantized $\phi$ |
|---|---|
| $\psi = \dfrac{k\pi}{2^{b_\psi+1}} + \dfrac{\pi}{2^{b_\psi+2}}$ radians<br><br>where<br><br>$k = 0, 1, \ldots, 2^{b_\psi} - 1$<br><br>$b_\psi$ is the number of bits used to quantize $\psi$<br><br>(defined by the Codebook Information field of the VHT MIMO Control field) | $\phi = \dfrac{k\pi}{2^{b_\phi-1}} + \dfrac{\pi}{2^{b_\phi}}$ radians<br><br>where<br><br>$k = 0, 1, \ldots, 2^{b_\phi} - 1$<br><br>$b_\phi$ is the number of bits used to quantize $\phi$<br><br>(defined by the Codebook Information field of the VHT MIMO Control field) |

*FIG. 5*

ACCESS POINT BEAMFORMING FOR WIRELESS DEVICE

BACKGROUND

Wireless networking can allow wireless devices, such as certain smartphones, laptops, tablets, or other suitable computing devices, to exchange data with other wired or wireless devices. In some wireless networks, a wireless device can access a wired portion of the network via one or more access points. Such access points can be designed to communicate with wireless devices at one or more radio frequencies based on capabilities of network equipment or other factors.

BRIEF DESCRIPTION OF DRAWINGS

FIG. 5 depicts a table for calculation of available angles from a compressed beamforming matrix, according to an example.

DETAILED DESCRIPTION

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on.

Robust security of wireless networks is critical to the adoption of wireless Internet of Things (IoT) devices and other related technologies. Some wireless IoT devices may have minimal authentication mechanisms, and in some cases, their security can be easily compromised. Such compromises can, for example, include physical tampering and masquerading from a near-by location. The present disclosure describes techniques, systems, etc., for a position- or direction-based authentication, which may provide an effective solution for such scenarios. Other solutions and improvements to existing wireless network technology are also described.

In some implementations, a method can include (a) receiving, with an Access Point (AP), a request from a wireless device to access a network through the AP; (b) determining, with the AP via beamforming of a fixed antenna array of the AP, whether an angle of the wireless device relative to the fixed antenna array is within a first predetermined range; determining, with the AP, whether a received signal strength between the AP and the wireless device is within a second predetermined range; and (c) granting, with the AP, the wireless device access to a network through the AP when it is determined that the angle of the wireless device relative to the fixed antenna array is within the first predetermined range and the received signal strength is within the second predetermined range.

Certain implementations of the present disclosure may allow wireless devices within a authorized area to reliably connect to a wireless network, while greatly reducing the risk of potentially malicious wireless devices outside of the authorized area from connecting to the wireless network. Other advantages of implementations presented herein will be apparent upon review of the description and figures.

Figure 1:
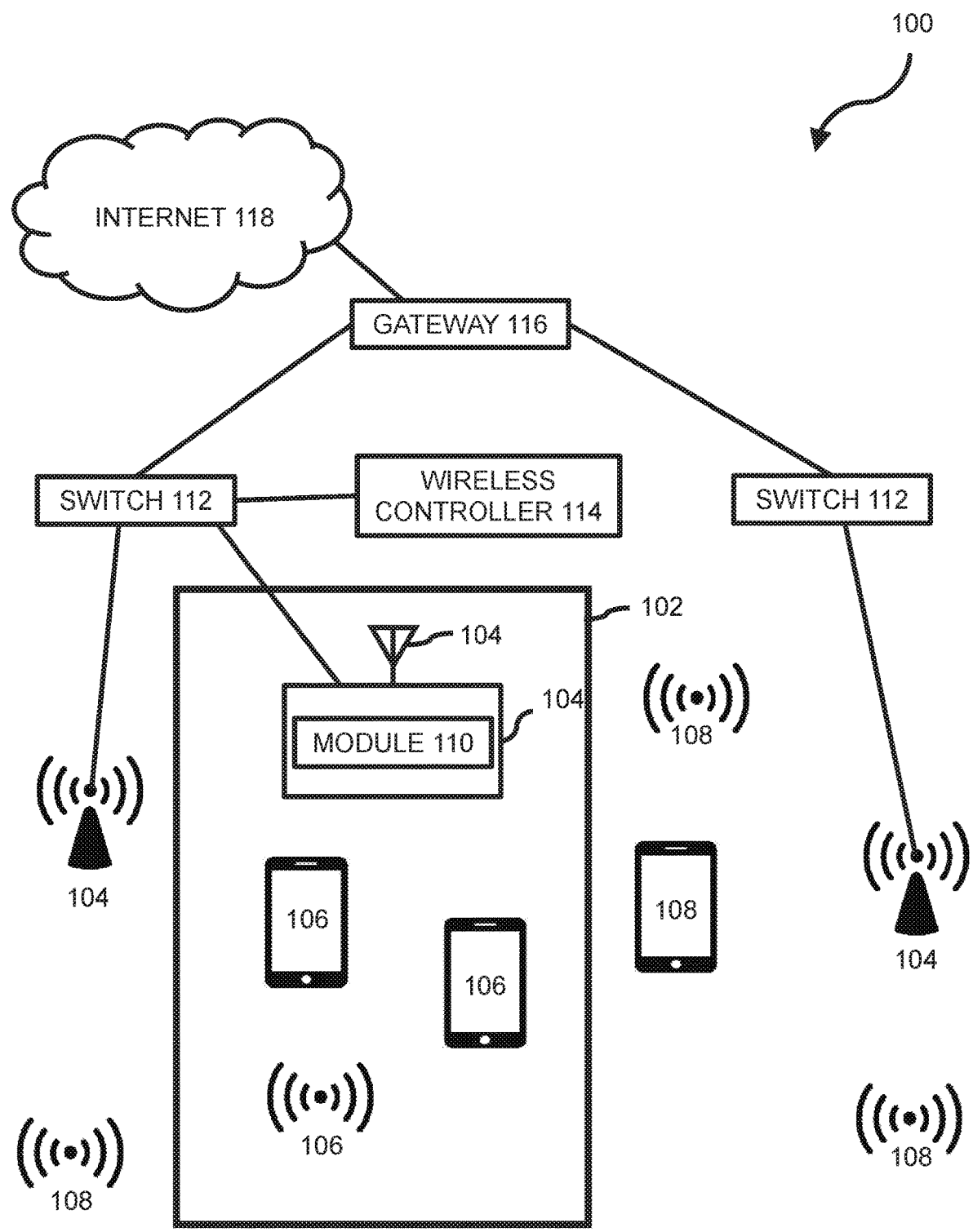
FIG. 1 is a diagram of an example network environment including wireless devices inside and outside of an authorized area, according to an example.
Figure 2:
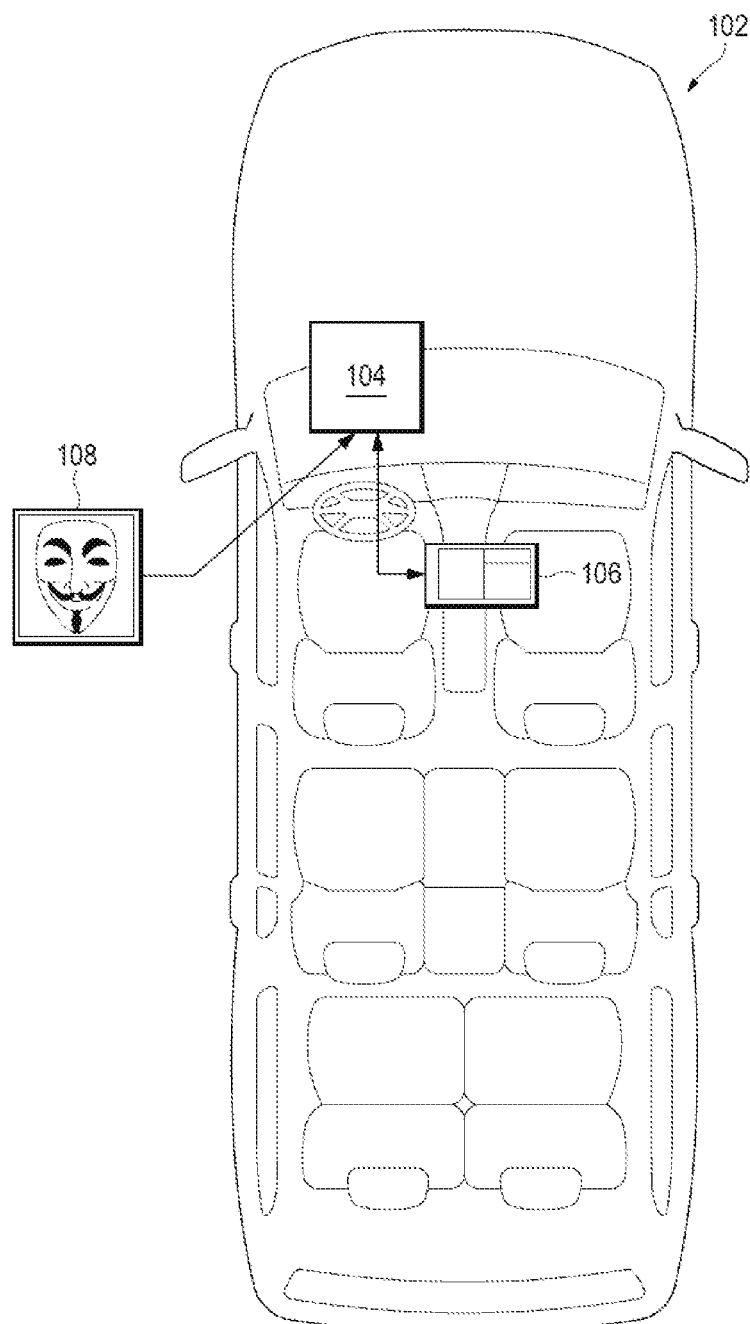
FIG. 2 is a diagram of a vehicle including an access point, according to an example.

FIGS. 1 and 2 are diagrams of an example network environment 100 that includes a local area network portion including an authorized area 102, an Access Point (AP) 104, various wireless devices 106 inside the authorized area 102 and various wireless devices 108 outside of the authorized area. In environment 100 of FIG. 1, AP 104 includes a position-based authentication module 110 as described in further detail below. In FIG. 2, authorized area 102 is in the form of a vehicle interior, wireless device 106 inside authorized area 102 is in the form of a wireless tablet device and wireless device 106 outside of authorized area 102 is in the form of a malicious wireless device attempting to infiltrate the wireless network provided by AP 104. For example, the malicious wireless device may be a wireless device located outside of a vehicle including AP 104 but attempting to infiltrate a computing system in wireless communication with AP 104. The structure and functionality of the various aspects of example environment 100 are described in further detail below.

The term "authorized area" as used herein can, for example, referred to an area that contains wireless devices that are authorized to attempt to connect to the wireless network provided by AP 104. In some implementations, the authorized area can be an area physically divided from an unauthorized area, such as an authorized room adjacent to an unauthorized room within range of AP 104 or an authorized vehicle interior physically divided from the exterior of the vehicle via a vehicle body. It is appreciated that although there may be a physical barrier between an interior of a vehicle and an exterior of the vehicle, wireless signal may nevertheless pass between the physical barrier. In some implementations of the present disclosure, there is no physical separation between authorized area 102 and unauthorized area 102. It is appreciated that the term "authorized area" can, for example, refer to any suitable subsection of a range provided by AP 104. For example, in some implementations, authorized area 102 can be a section of a room (e.g., a stage area of a theater) or a section of a vehicle (e.g., a first class area of an airplane) that does not include a physical barrier separating the authorized area from an unauthorized area.

In some implementations, the term "authorized area" can refer to any place where an AP and wireless device are relatively or actually static. For example, in some implementations, an AP and wireless device may be mounted such that the position of the AP and the position of the wireless device are fixed relative to each other. For example, an AP mounted to a ceiling of a smart home and an IoT device mounted to a wall in the smart home. As another example, in a self-driven vehicle, an AP may be mounted within a dashboard of the vehicle and a wireless radar can be mounted to an exterior of the vehicle. As another example, an AP may be mounted on a ceiling of a hospital and an oxygen pipe with a wireless transmitter may be mounted within a wall of the hospital. In such an implementation, authentication can be denied (or some other action taken) based on a difference in a first recorded angle of the wireless device relative to the fixed antenna array compared to a second recorded angle of the wireless device relative to the fixed antenna array and/or a difference in a first recorded signal strength compared to a second recorded signal strength. In such a situation, a decision may be made not based on an actual determined position of a wireless, but instead (or in combination with) based on a change in position relative to a previously approved position.

The terms "access point" or "AP" as used herein, can, for example, refer to networking hardware device that allows a Wi-Fi compliant device to connect to a wired network. Such an AP 104 may be connected to an upstream wired device, such as a computing system (described for example with respect to FIG. 8), switch 112, wireless controller 114, etc., via an Ethernet connection or other suitable connection and may provide one or more downstream wireless connections using Radio Frequency (RF) links for other wireless devices. AP 104 can support one or more industry standards for sending and receiving data using these radio frequencies, such as the Institute of Electrical and Electronics Engineers (IEEE) 802.11 standard or other suitable standards. AP 104 can, for example, be in the form of a standalone device connected to a gateway (e.g., gateway 118), router, or other intermediate datapath device. In some implementations, AP 104 may be an integral component of such an intermediate datapath device or other network equipment.

As used herein, the term "wireless controller" can, for example, refer to any suitable entity that handles control and management functions of a network or equipment thereof. For example, wireless controller 114 can be used to control one or more aspects of APs 104, such as channel assignment, beamforming, radio resource management (RRM), etc. In some implementations, applications can run on wireless controller 114 or on other devices on the network (or otherwise in communication with the network) to meet customer use cases, such as to achieve a desired throughput (or another Quality of Service (QoS)) over the network, enforce security provisions or access control policies for the network, or provide another suitable service or functionality. It is appreciated that AP 104 can include one or more aspects of such wireless controller, especially in environments where an environment may not include a standalone wireless controller is used, such as for example in a consumer vehicle.

In some implementations, wireless controller 114 can allow for the decoupling of traffic routing control decisions (e.g., which port of a given switch should be used to forward traffic to a given destination) from the network's physical infrastructure. For example, in some implementations, wireless controller 114 can be in the form of an SDN controller and switches 112 can be in the form of SDN-enabled switches that are within the control domain of the SDN controller. In some environments, one or more network nodes within environment 100 may be deemed to be "controlled" by another device, such as wireless controller 114. As used herein, the term "controlled" can, for example, refer to devices within the control domain of the wireless controller 114 or otherwise controllable by wireless controller 114. Such a controlled node can, for example, communicate with wireless controller 114 and can allow wireless controller 114 to manage the node in accordance with a protocol. For example, an OpenFlow-compatible switch controlled by a wireless controller 114 with SDN capabilities may permit controller 114 to add, update, and delete flow entries in flow tables of switch 112 using suitable commands.

In some network environments, a data packet may be routed from a given switch 112 to a given wireless device 106 through one or more data paths that may include wireless links (e.g., a wireless link between AP 104 and wireless device 106). For example, in some network environments, a data packet may be routed to wireless device 106 along a first datapath that uses a first AP 104 or alternatively along a second datapath that uses a second AP 104. A given data path for data packets within environment 100 can be determined by wireless controller 114 (or another entity, such as by a network administrator, by datapath nodes themselves, etc.) based on one or more static parameters (e.g., link speeds, number of hops between nodes, etc.) and can further (or alternatively) be based on one or more dynamic parameters (e.g., QoS, network latency, network throughput, network power consumption, etc.).

Network nodes within environment 100 can forward traffic along a datapath based on metadata within the traffic. For example, traffic in the form of a packet can be received at switch 112 (or another suitable intermediary network node). For consistency, the industry term "packet" is used throughout this description, however, it is appreciated that the term "packet" as used herein can refer to any suitable protocol data unit (PDU). Such a packet can, for example, include payload data as well as metadata in the form of control data. Control data can, for example, provide data to assist the network node with reliably delivering payload data. For example, control data can include network addresses for source and destination nodes (e.g., wireless device 106), error detection codes, sequencing information, packet size of the packet, a time-to-live (TTL) value, etc. In contrast, payload data can include data carried on behalf of an application for use by source and destination nodes.

Wireless devices can, for example, be in the form of network hosts or other types of network nodes. Wireless devices are depicted as mobile phones and other devices in FIGS. 1 and 2, however such clients can be in the form of any suitable device that can transmit and receive wireless data with an AP 104. For example, in some implementations, wireless devices can be in the form of suitable mobile phones, tablets, laptops, servers, desktop computers, printers, APs, wireless sensors, beacons, Internet of Things (IoT) devices, wireless clients, etc. In certain implementations, one or more wireless devices can be in the form of a desktop computer including a monitor for presenting information to an operator and a keyboard and mouse for receiving input from an operator and one or more wireless devices can be in the form of smart phones. It is appreciated that wireless devices can be endpoint nodes of environment 100 (such as depicted in FIGS. 1 and 2), intermediate nodes between endpoint nodes, or positioned at other logical or physical locations within environment 100.

Various intermediary nodes within the network environment can, for example, be in the form of switches (e.g., switches 112) or other multi-port network bridges that process and forward data at the data link layer. In some implementations, one or more of the nodes can be in the form of multilayer switches that operate at multiple layers of the Open Systems Connection (OSI) model (e.g., the data link and network layers). Although the term "switch" is used throughout this description, it is appreciated that this term can refer broadly to other suitable network data forwarding devices. For example, a general purpose computer can include suitable hardware and machine-readable instructions that allow the computer to function as a network switch. It is appreciated that the term "switch" can include other network datapath elements in the form of suitable routers, gateways and other devices that provide switch-like functionality for the network. Gateway 118 can, for example, be in the form of a network node that acts as an entrance to another network, such as Internet 118 or another suitable Wide Area Network (WAN) or Local Area Network (LAN).

The various nodes within network environment 100 are connected via one or more data channels (shown in solid lines), which can, for example be in the form of data cables or wireless data channels. Although a single link (i.e., a single line in FIG. 1) between each network node is illustrated, it is appreciated that each single link may include multiple wires or other wired or wireless data channels. In certain implementations, the functionality and/or equipment for wireless controller 114 can reside within Internet 118 or another network.

In the example environment 100 depicted in FIG. 1, the various network nodes are in the form of intermediary nodes (e.g., switches 112, gateway 116, APs 104), a controller node (e.g., wireless controller 114), and host devices (wireless devices 106 and 108). It is appreciated however, that the implementations described herein can be used or adapted for networks including more or fewer devices, different types of devices, and different network arrangements. As an example, in some implementations, wireless controller 114 may operate as an intermediary node or a host device. As another example, in some implementations, such as in certain mesh networks, a backhaul of the network may be wireless instead of wired. In such an implementation, an AP may wirelessly relay data to another AP that is connected to the wired backbone, to thereby use a wireless link between two APs as a wireless backhaul.

Figure 3:
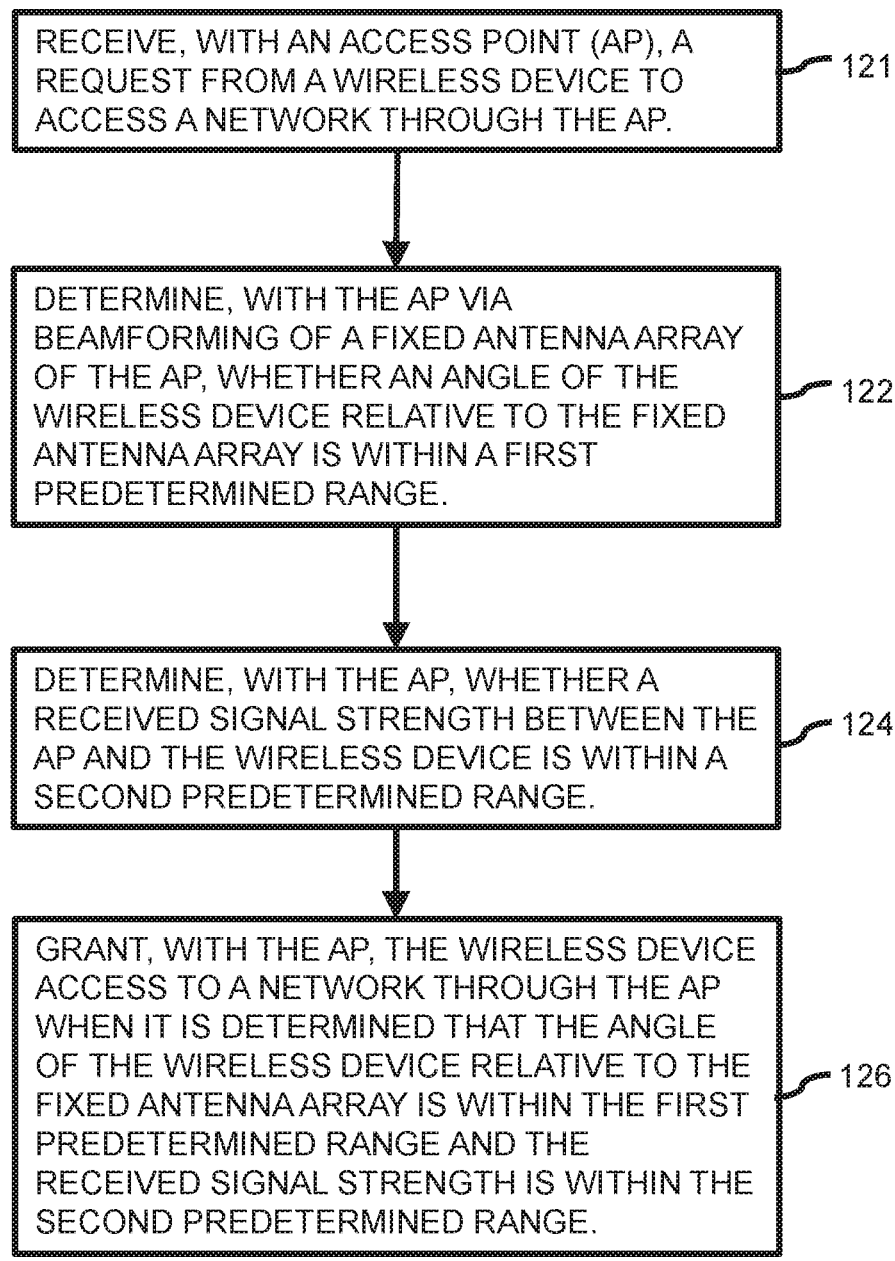
FIG. 3 is a flowchart for a method, according to an example.

FIG. 3 illustrates an example implementation method 120 of the present disclosure. For illustration, the description of method 120 and its component steps make reference to the example network environment 100 of FIG. 1 and elements thereof, such as for example APs 104, wireless devices 106 and 108, etc. However, it is appreciated that method 120 or aspects thereof can be used or otherwise applicable for any suitable network or network element described herein or otherwise. For example, method 120 can be applied to an environment 100 with a different number of APs 104, wireless devices 106 and 108, etc.

In some implementations, method 120 can be implemented or otherwise executed through the use of executable instructions stored on a memory resource (e.g., the memory resource of FIG. 8), executable machine readable instructions stored on a storage medium (e.g., the medium of FIG. 9), in the form of electronic circuitry (e.g., on an Application-Specific Integrated Circuit (ASIC)), and/or another suitable form. Although the description of method 120 herein primarily refers to steps performed on AP 104 for purposes of illustration, it is appreciated that in some implementations, method 120 can be executed on another computing device within network environment 100 (e.g., wireless controller 114) or in data communication with network environment 100. In some implementations, method 120 can be executed on network devices in parallel (e.g., in a distributed computing fashion).

Method 120 includes receiving (at block 121), with AP 104, a request from a wireless device to access a network through AP 104. In some implementations, the wireless device can send a probe requests to discover 802.11 networks within its proximity. The probe requests can, for example, advertise the wireless device's supported data rates and 802.11 capabilities. It is appreciated that the wireless range of AP 104 may extend beyond the boundary of authorized area 102 and as provided above, the wireless device can either be a device within authorized area 102 or outside of authorized area 102.

Figure 4:
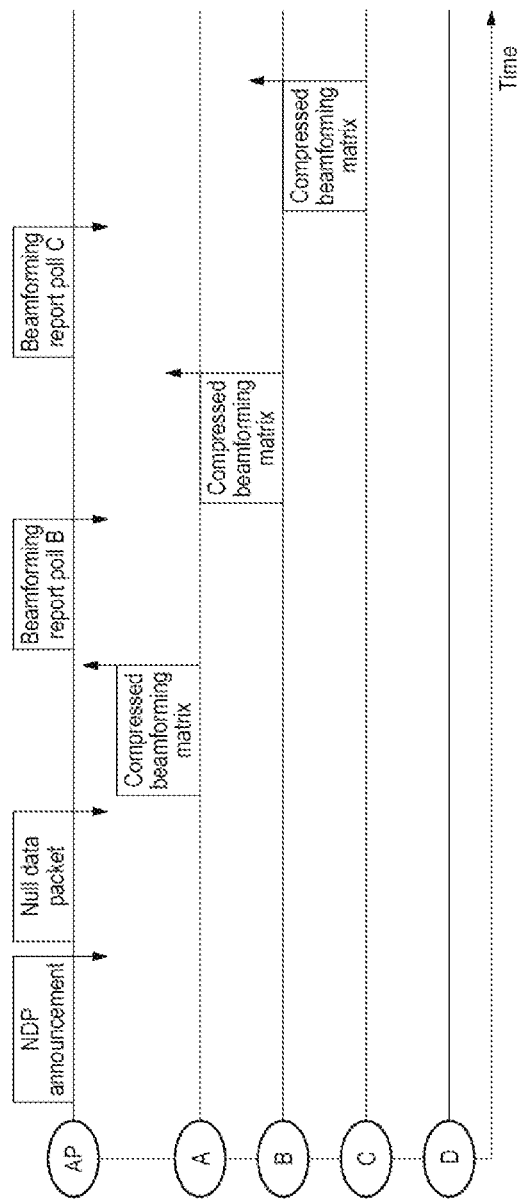
FIG. 4 is a diagram depicting a downlink multi-user MIMO sounding frame and beamforming feedback, according to an example.

Method 120 includes determining (at block 122), with AP 104 via beamforming of a fixed antenna array of AP 104, whether an angle of the wireless device relative to the fixed antenna array is within a first predetermined range. In some implementations, determining whether an angle of the wireless device relative to the fixed antenna array is within the first range is based on a beamforming index of the wireless device. FIG. 4 depicts a downlink multi-user MIMO sounding frame and beamforming feedback, according to an example. FIG. 5 depicts a table for calculation of available angles from a compressed beamforming matrix, according to an example. As provided in these figures, such angles can be derived from a number of bits used to quantize an angle, which may be defined by a Codebook information field of a VHT MIMO Control field.

The first predetermined range can, for example, a range of acceptable angles for authorized area 102. For example, in an environment where AP 104 is positioned at a front of a vehicle, acceptable angles may range from −30 degrees to 30 degrees relative to a longitudinal axis defined by the vehicle. Any signal outside of this predetermined range may be considered to fall outside of the authorized area. It is appreciated that the example of −30 degrees to 30 degrees is used for illustration only. The actual range may be determined based on several factors, such as for example the dimensions of the vehicle or environment, expected positions of authorized devices, etc. It is further appreciated that the first predetermined range may be influenced by the second predetermined range as described further below.

Method 120 includes determining (at block 124), with AP 104, whether a received signal strength between AP 104 and the wireless device is within a second predetermined range. The first predetermined range can, for example, be associated with a range of acceptable distances between AP 104 and the wireless device that may indicate the wireless device being positioned within authorized area 102. For example, in an environment where AP 104 is positioned at a front of a vehicle, acceptable distances may range from 0 feet to 10 feet A signal strength determined to be outside of this predetermined range may be considered to fall outside of the authorized area. It is appreciated that the example of 0-10 feet is used for illustration only. The actual range may be determined based on several factors, such as for example the dimensions of the vehicle or environment, expected positions of authorized devices, etc. It is further appreciated that the second predetermined range may be influenced by the first predetermined range. For example, the second predetermined range may be a first range when the wireless device is determined to be at a first angle relative to the fixed antenna array and may be a second range when the wireless device is determined to be at a second angle relative to the fixed antenna array. That is, in some implementations, AP 104 may require a wireless device to be closer to the fixed antenna array if the wireless device is determined to be at a greater angle relative to a longitudinal axis defined by the vehicle. Likewise, the AP may allow for a broader range of distances relative to the fixed antenna array if the wireless device is determined to be along or close to a longitudinal axis defined by the vehicle.

Method 120 includes granting (at block 126), with AP 104, the wireless device access to a network through AP 104 when it is determined that the angle of the wireless device relative to the fixed antenna array is within the first predetermined range and the received signal strength is within the second predetermined range. Block 126 can include an association process following receipt of a probe from the wireless device or other request to associate. For example, in some implementations, in response to a probe request from the wireless device, AP 104 may check to see if the wireless device has at least one common supported data rate. If the wireless device and AP have a compatible data rate, a probe response may be sent from AP 104 to the wireless device, which advertises a Service Set Identifier (SSID), supported data rates, encryption types if required, and other 802.11 capabilities of AP 104. It is appreciated that information other than signal strength or distance can be used along with method 120 to determine whether to grant a wireless device access to a network through AP 104.

The wireless device may then attempt an 802.11 authentication with AP 104. If the wireless device is successfully authenticated via 802.11 authentication, the wireless device may then attempt a WPA2 or 802.1X authentication mechanism. If the wireless device successfully authenticates to AP 104, then data transfer may begin between the wireless device and AP 104.

It is appreciated that the use of one or more techniques or systems described herein may allow for authentication decisions to be made based at least in part on a direction and signal strength of a wireless device. In some implementations, AP 104 may communicate with wireless devices only if they are determined to be at specific angle and may accept incoming communication only if the communications come from such an angle. In some implementations, manufacturers of AP 104 or an environment comprising AP 104 (e.g., a vehicle with an integrated Wi-Fi system) may rely on the techniques described in the present disclosure to configure an acceptable level of deviation in angle and/or distance for each wireless device (5%, 10 feet, etc.).

Implementations of the present disclosure can, in some situations, provide a formidable barrier to hackers or other malicious agents attempting to infiltrate a computing system by impersonating as compromised device from outside of an authorized area. As provided herein, the direction of an wireless device or other client can be acquired by AP 104 from beamforming indices of each wireless device. The parameters of Signal strength & Direction can provide AP 104 or other equipment in communication with AP 104 with an approximate idea of where a valid wireless device should be located.

In some implementations, the predetermined first range and the predetermined second range indicate that the wireless device is in an authorized location relative to the AP. As provided herein, the predetermined first range and the predetermined second range can, for example, be determined to indicate that wireless device is in an authorized location within an interior of a vehicle. Likewise, in some implementations, the predetermined first range and the predetermined second range are determined to indicate that wireless device is in an authorized location within a building. It is appreciated that the term "authorized location relative to the AP" can, for example, refer to any suitable authorized area or other subdivision of a wireless range area as described herein.

In some implementations, granting, with AP 104, the wireless device access to a network through AP 104 is to occur when AP 104 determines that the angle of the wireless device is within the first predetermined range, AP 104 determines that the received signal strength is within the second predetermined range, and AP 104 determines that the wireless device has been authenticated through a second method.

The second method can, for example, be a password-based authentication method. For example, AP 104 may request an SSID, even if the wireless device is within authorized area 102 as another security check before granting the wireless device access to the network. Any suitable second or additional authentication method may be requested by AP 104 or another device within environment 100. In some implementations, the second method can, for example, be a biometric-based authentication method. For example, AP 104 or another device within environment 100 may request a fingerprint-based authentication either via the wireless device or another device. For example, in some implementations, AP 104 may provide wireless network access to a highly secured area and may request direction or position-based authentication via one or more methods described herein, as well as a fingerprint scan at a standalone fingerprint scanner in data communication with AP 104.

It is appreciated that one or more operations of method 120 can be performed periodically. For example, in some implementations, one or more of blocks 122, 124, 126, and 128 (or other operations described herein) may be performed periodically. The various period times for these blocks (or other operations described herein) may be the same or different times. For example, in some implementations, the period of block 122 is every 1 minute and the period of block 124 is every 2 minutes. It is further appreciated, that the period for a given block may be regular (e.g., every 1 minute) or may be irregular (e.g., every 1 minute during a first network condition, and every 2 minutes during a second network condition). In some implementations, one or more of these block (or other operations described herein) may be non-periodic and may be triggered by some network or other event. In some implementations, for example, in certain stringent security environments, one or more operations may be performed every time a beamforming matrix is calculated. In such a situation, the beamforming matrix may be checked to determine whether its coordinates are within an approved angle range, signal strength, etc.

Although the flowchart of FIG. 3 shows a specific order of performance, it is appreciated that this order may be rearranged into another suitable order, may be executed concurrently or with partial concurrence, or a combination thereof. Likewise, suitable additional and/or comparable steps may be added to method 120 or other methods described herein in order to achieve the same or comparable functionality. In some implementations, one or more steps are omitted. It is appreciated that blocks corresponding to additional or alternative functionality of other implementations described herein can be incorporated in method 120. For example, blocks corresponding to the functionality of various aspects of implementations otherwise described herein can be incorporated in method 120 even if such functionality is not explicitly characterized herein as a block in method 120.

Figure 6:
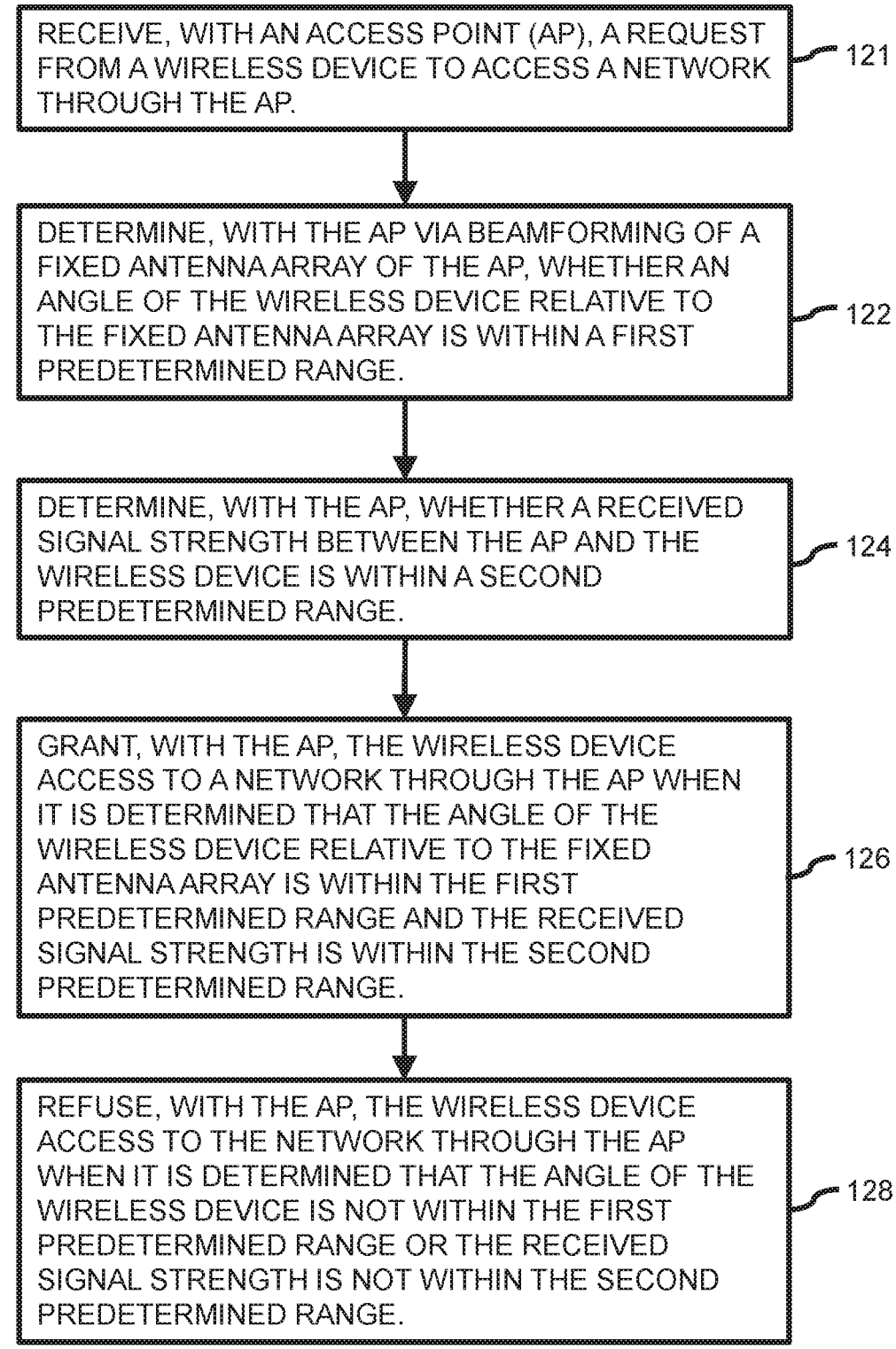
FIG. 6 is a flowchart for a method, according to another example.

FIG. 6 illustrates another example of method 120 in accordance with the present disclosure. For illustration, FIG.

6 reproduces various blocks from method 120 of FIG. 3, however it is appreciated that method 120 of FIG. 6 can include additional, alternative, or fewer steps, functionality, etc., than method 120 of FIG. 3 and is not intended to be limited by the diagram of FIGS. 1 and 2 (or vice versa) or the related disclosure thereof. It is further appreciated that method 120 of FIG. 3 can incorporate one or more aspects of method 120 of FIG. 6 and vice versa. For example, in some implementations, method 120 of FIG. 3 can include the additional step described below with respect to method 120 of FIG. 6.

Method 120 of FIG. 6 includes refusing (at block 128), with AP 104, the wireless device access to the network through AP 104 when it is determined that the angle of the wireless device is not within the first predetermined range or the received signal strength is not within the second predetermined range. In some implementations, block 128 can further include temporarily banning access of a wireless device refused access to AP 104, blacklist or quarantine the refused wireless device, or another suitable action based on refusing access to AP 104.

Figure 7:
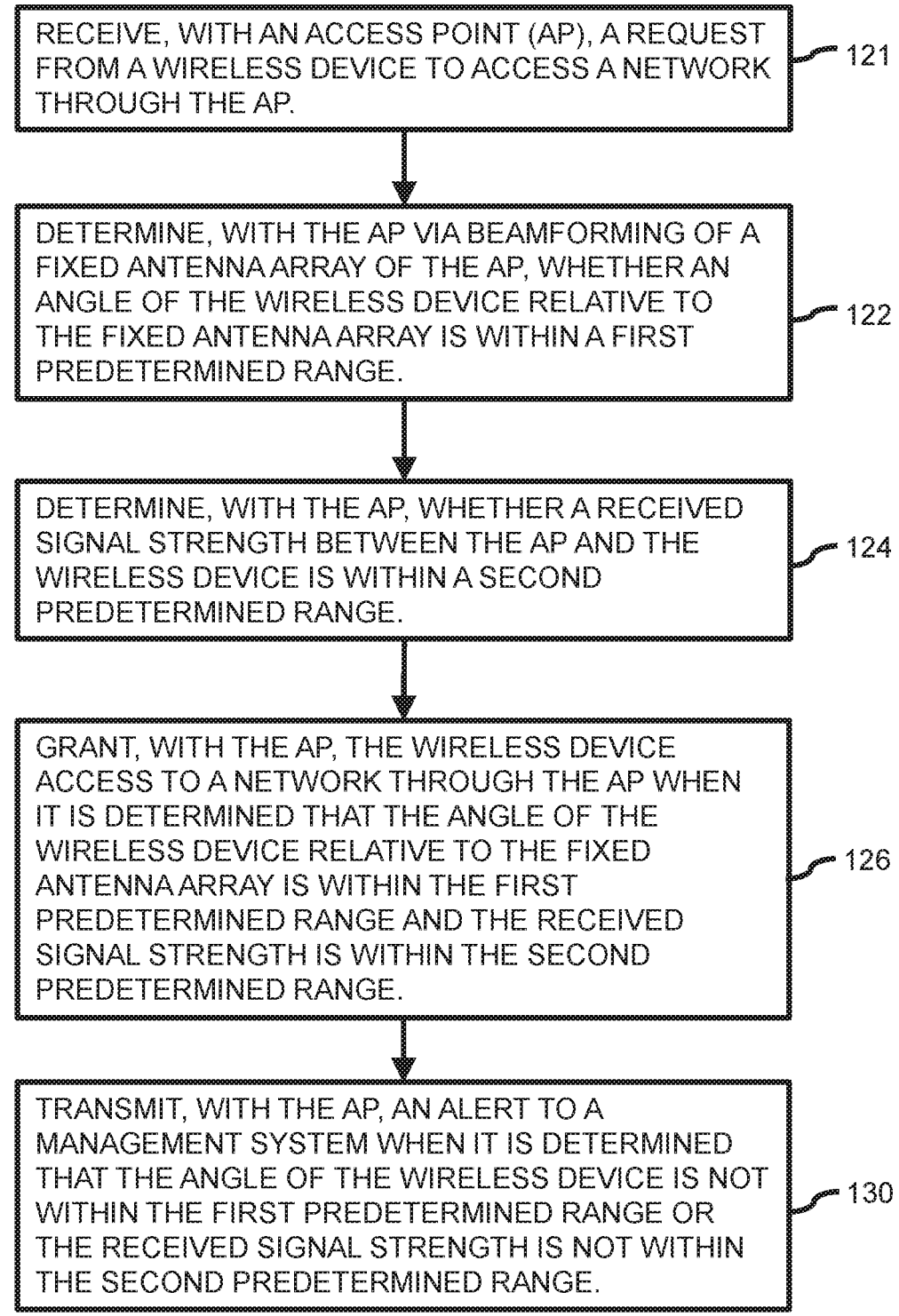
FIG. 7 is a flowchart for a method, according to another example.

FIG. 7 illustrates another example of method 120 in accordance with the present disclosure. For illustration, FIG. 7 reproduces various blocks from method 120 of FIG. 3, however it is appreciated that method 120 of FIG. 7 can include additional, alternative, or fewer steps, functionality, etc., than method 120 of FIG. 2 and is not intended to be limited by the diagram of FIGS. 1-2 (or vice versa) or the related disclosure thereof. It is further appreciated that method 120 of FIG. 3 or 6 can incorporate one or more aspects of method 120 of FIG. 7 and vice versa. For example, in some implementations, method 120 of FIG. 6 can include the additional step described below with respect to method 120 of FIG. 7.

Method 120 of FIG. 7 includes transmitting (at block 130), with AP 104, an alert to a management system when it is determined that the angle of the wireless device is not within the first predetermined range or the received signal strength is not within the second predetermined range. Such an alert can, for example, include information about the wireless device such as information about the association request, equipment, direction, signal strength, time of association attempt, or any other suitable information provided to AP 104 or another device by the wireless device. The notification can trigger a warning on a display of a computing system associated with AP 104 (e.g., on a display dashboard of a vehicle) to alert a user that an association attempt was made. In some implementations, the notification can be sent to a remote management system for further actions or analysis.

Figure 8:
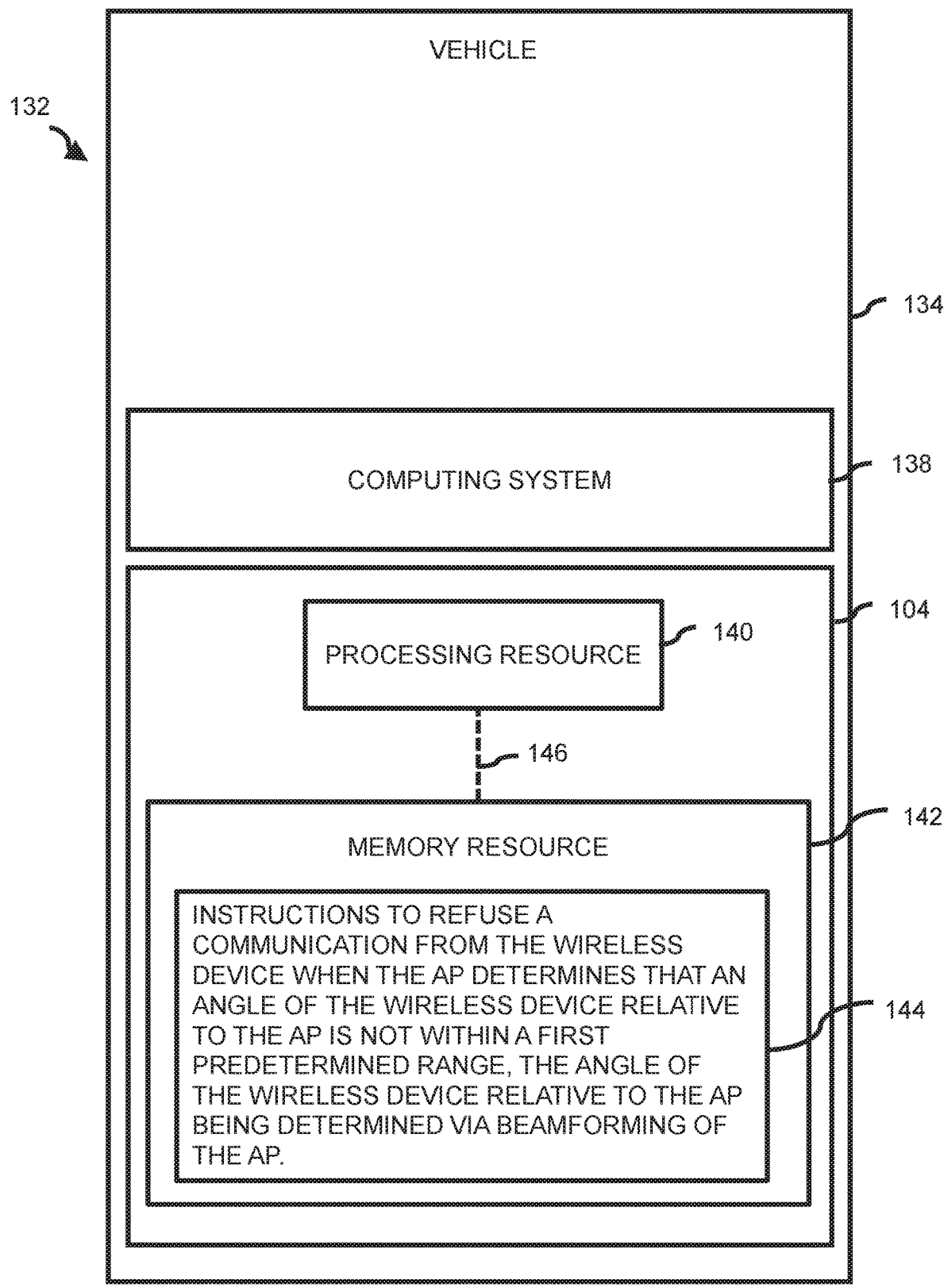
FIG. 8 is a diagram of a vehicle including an access point, according to another example.

FIG. 8 is a diagram of a vehicle 132, the interior of which defines an authorized area. It is appreciated that the example of vehicle 132 is used for illustration only and is not intended to be limiting to the scope of the present disclosure. Any suitable authorized area, such as a building, a room, an outdoor area, another type of vehicle, etc., or any suitable subdivision thereof can apply to the description herein. In this example, vehicle 132 can include a vehicle body 134, a computing system 138 secured to vehicle body 134, and an AP (e.g., AP 104) to allow an authenticated wireless device to wirelessly communicate with computing system 138.

Computing system 138 can, for example, include any suitable computing system for communicating with wireless device 106. For example, in some implementations, computing system 138 can be in the form of a vehicle dashboard console or entertainment system. Wireless device 106 can, for example, be in the form of a mobile phone, tablet, laptops, etc., that connects to computing system 138 to display information from the wireless device 106 on a display of computing system 138, provide instructions to computing system (e.g., climate control, other vehicle setting), etc. Certain implementations of the present disclosure describe a technique by which wireless security can be improved between a wireless device and computing system 138 via a Wi-Fi wireless communication protocol. It is appreciated that the technique may be applied with appropriate modifications to any other suitable wireless communication protocol, such as Bluetooth, RFID, etc.

As described in further detail below, AP 104 includes a processing resource 140 and a memory resource 142 that stores machine-readable instructions 144. For illustration, the description of computing device 106 makes reference to various 25s aspects of the diagrams of FIGS. 1-2 as well as method 120 of FIGS. 3, 6, and 7. However it is appreciated that computing device 106 can include additional, alternative, or fewer aspects, functionality, etc., than the implementations described elsewhere herein and is not intended to be limited by the related disclosure thereof.

Instructions 144 stored on memory resource 142 are, when executed by processing resource 140, to cause processing resource 140 to refuse a communication from the wireless device when AP 104 determines that an angle of the wireless device relative to AP 104 is not within a first predetermined range. In some implementations, the angle of the wireless device relative to AP 104 is determined via beamforming of the AP. Instructions 144 can incorporate one or more aspects of blocks of method 120 or another suitable aspect of other implementations described herein (and vice versa). For example, in some implementations, memory resource 142 stores machine readable instructions to cause the processing resource to accept a communication from the wireless device when the AP determines that an angle of the wireless device relative to the AP is within a first predetermined range and when the AP determines that a distance between the wireless device and the AP is within a second predetermined range.

In some implementations, vehicle body 134 defines a passenger space within vehicle 132 and instructions on memory resource 142 instruct AP 104 to accept a communication from the wireless device when AP 104 determines that the wireless device is located within the passenger space based on the angle of the wireless device relative to AP 104 and the distance between the wireless device and AP 104. It is appreciated that in some implementations, the authorized area is outside of the vehicle. For example, tow hitch may be located outside of vehicle 132 but may include a wireless transmitter for transmitting information about towing conditions to computing system 138. It is appreciated that there are other situations in which AP 104 or another suitable entity or person may wish to define an authorized area outside of the physical interior of a vehicle or other environment.

In some implementations, AP 104 accepts a communication from the wireless device when AP 104 determines that the wireless device is located within an authorized area based on the angle of the wireless device relative to AP 104 and the distance between the wireless device and AP 104.

Processing resource 140 of computing device 106 can, for example, be in the form of a central processing unit (CPU), a semiconductor-based microprocessor, a digital signal processor (DSP) such as a digital image processing unit, other hardware devices or processing elements suitable to retrieve and execute instructions stored in memory resource 142, or suitable combinations thereof. Processing resource 140 can, for example, include single or multiple cores on a chip, multiple cores across multiple chips, multiple cores across multiple devices, or suitable combinations thereof. Processing resource 140 can be functional to fetch, decode, and execute instructions as described herein. As an alternative or in addition to retrieving and executing instructions, processing resource 140 can, for example, include at least one integrated circuit (IC), other control logic, other electronic circuits, or suitable combination thereof that include a number of electronic components for performing the functionality of instructions stored on memory resource 142. The term "logic" can, in some implementations, be an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Processing resource 140 can, for example, be implemented across multiple processing units and instructions may be implemented by different processing units in different areas of computing device 106.

Memory resource 142 of computing device 106 can, for example, be in the form of a non-transitory machine-readable storage medium, such as a suitable electronic, magnetic, optical, or other physical storage apparatus to contain or store information such as machine-readable instructions 144. Such instructions can be operative to perform one or more functions described herein, such as those described herein with respect to method 120 or other methods described herein. Memory resource 142 can, for example, be housed within the same housing as processing resource 140 for computing device 106, such as within a computing tower case for computing device 106 (in implementations where computing device 106 is housed within a computing tower case). In some implementations, memory resource 142 and processing resource 140 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, memory resource 142 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that both machine-readable instructions as well as related data can be stored on memory mediums and that multiple mediums can be treated as a single medium for purposes of description.

Memory resource 142 can be in communication with processing resource 140 via a communication link 146. Each communication link 146 can be local or remote to a machine (e.g., a computing device) associated with processing resource 140. Examples of a local communication link 146 can include an electronic bus internal to a machine (e.g., a computing device) where memory resource 142 is one of volatile, non-volatile, fixed, and/or removable storage medium in communication with processing resource 140 via the electronic bus.

In some implementations, one or more aspects of vehicle 132 (e.g., AP 104) can be in the form of functional modules that can, for example, be operative to execute one or more processes of instructions 144 or other functions described herein relating to other implementations of the disclosure. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or hardware and software hosted at hardware. It is further appreciated that the term "module" is additionally intended to refer to one or more modules or a combination of modules. Each module of computing device 106 can, for example, include one or more machine-readable storage mediums and one or more computer processors.

In view of the above, it is appreciated that the various instructions of computing device 106 described above can correspond to separate and/or combined functional modules. For example, instructions 144 can correspond to a "position-based authentication module" (e.g., module 110 of FIG. 1) to refuse a communication from the wireless device when the AP determines that an angle of the wireless device relative to the AP is not within a first predetermined range. It is further appreciated that a given module can be used for multiple functions. As but one example, in some implementations, a single module can be used to both determine position of a wireless device as well as to authenticate the wireless device based on the determined position.

In some implementations, AP 104 can further include a suitable communication module to allow networked communication between network equipment. Such a communication module can, for example, include a network interface controller having an Ethernet port and/or a Fibre Channel port. In some implementations, such a communication module can include wired or wireless communication interface, and can, in some implementations, provide for virtual network ports. In some implementations, such a communication module includes hardware in the form of a hard drive, related firmware, and other software for allowing the hard drive to operatively communicate with other hardware of AP 104 or other network equipment. The communication module can, for example, include machine-readable instructions for use with communication the communication module, such as firmware for implementing physical or virtual network ports.

Figure 9:
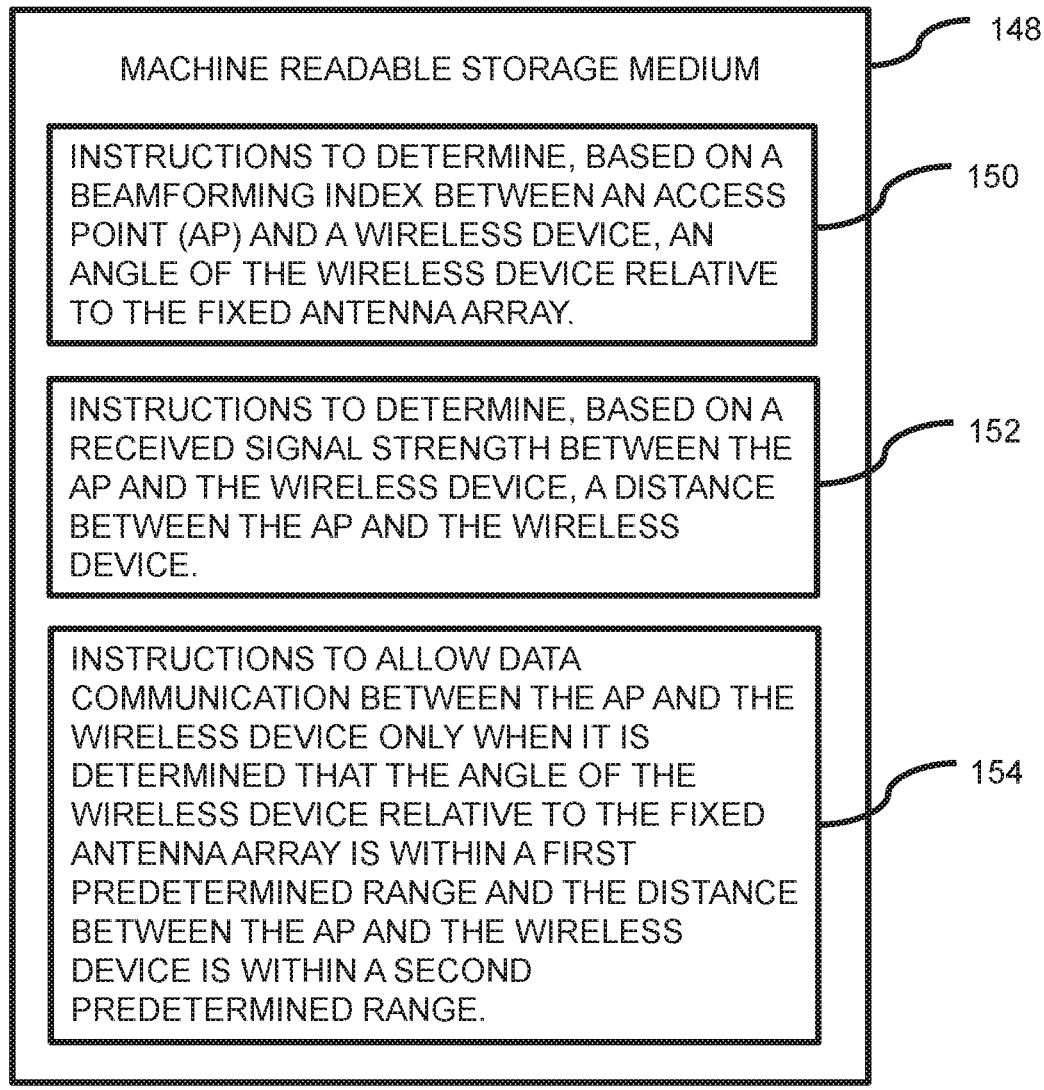
FIG. 9 is a diagram of machine-readable storage medium, according to an example.

FIG. 9 illustrates a machine-readable storage medium 148 including various instructions that can be executed by a computer processor or other processing resource. In some implementations, medium 148 can be housed within an AP, such as AP 104 or on another computing device within network environment 100 or in local or remote wired or wireless data communication with network environment 100. For illustration, the description of machine-readable storage medium 148 provided herein makes reference to various aspects of computing device 106 (e.g., processing resource 140) and other implementations of the disclosure (e.g., method 120). Although one or more aspects of computing device 106 (as well as instructions such as instructions 144) can be applied to or otherwise incorporated with medium 148, it is appreciated that in some implementations, medium 148 may be stored or housed separately from such a system. For example, in some implementations, medium 148 can be in the form of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof.

Medium 148 includes machine-readable instructions 150 stored thereon to cause processing resource 140 to determine, based on a beamforming index between AP 104 and a wireless device (e.g., wireless device 106 or 108), an angle of the wireless device relative to the fixed antenna array. Instructions 150 can, for example, incorporate one or more aspects of blocks of method 120 or another suitable aspect of other implementations described herein (and vice versa). For example, in some implementations, the angle of the wireless device may, by itself or in conjunction with other measurements, indicate that the wireless device is position outside of an authorized area relative to AP 104 (e.g., at an angle that indicates the wireless device is positioned exterior to a vehicle interior).

Medium 148 includes machine-readable instructions 152 stored thereon to cause processing resource 140 to determine, based on a received signal strength between AP 104 and the wireless device, a distance between AP 104 and the wireless device. Instructions 152 can, for example, incorporate one or more aspects of blocks of method 120 or another suitable aspect of other implementations described herein (and vice versa). For example, in some implementations, the signal strength may indicate, by itself or in conjunction with the determined angle, that the wireless device is located at a position outside of an authorized area relative to AP 104.

Medium 148 includes machine-readable instructions 154 stored thereon to cause processing resource 140 to allow data communication between AP 104 and the wireless device only when it is determined that the angle of the wireless device relative to the fixed antenna array is within a first predetermined range and the distance between AP 104 and the wireless device is within a second predetermined range. Instructions 154 can, for example, incorporate one or more aspects of blocks of method 120 or another suitable aspect of other implementations described herein (and vice versa). For example, in some implementations, in some implementations, the data communication includes a request from the wireless device to connect to a network through the AP. In some implementations, the data communication includes access to an external network through the AP (e.g., the Internet) and/or access to an internal computing system of a vehicle that houses the AP (e.g., an on-board computing system).

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

As used herein, "logic" is an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Further, as used to herein, "a" or "a number of" something can refer to one or more such things. For example, "a number of widgets" can refer to one or more widgets. Also, as used herein, "a plurality of" something can refer to more than one of such things.

I claim:

1. A method comprising:
  receiving, with an Access Point (AP), a request from a wireless device to access a network through the AP;
  determining, with the AP via beamforming of a fixed antenna array of the AP, whether an angle of the wireless device relative to the fixed antenna array is within a first predetermined range, wherein determining the angle of the wireless device relative to the fixed antenna array includes determining an angle based at least in part on a beamforming index;
  determining, with the AP, whether a received signal strength between the AP and the wireless device is within a second predetermined range, wherein the second predetermined range is based at least in part on the determined angle of the wireless device relative to the fixed antenna array, the second determined range being a first range for a determined angle of a first angle value and a second range for a determined angle of a second angle value, wherein the first angle value is greater than the second angle value in relation to an axis for the fixed antenna array, and wherein the first range requires a stronger received signal strength for the wireless device than the second range; and granting, with the AP, the request from the wireless device to access the network through the AP when it is determined that the determined angle of the wireless device relative to the fixed antenna array is within the first predetermined range and the received signal strength is within the second predetermined range,
  wherein granting the request comprises sending a response to the wireless device, the response comprising a plurality of association information to facilitate allowing the wireless device access to the network through the AP.

2. The method of claim 1, wherein the predetermined first range and the predetermined second range are utilized to determine whether the wireless device is in an authorized location relative to the AP.

3. The method of claim 1, wherein the axis is a longitudinal axis of a vehicle, and wherein the predetermined first range and the predetermined second range are determined to indicate that the wireless device is in an authorized location within an interior of the vehicle.

4. The method of claim 1, wherein the predetermined first range and the predetermined second range are determined to indicate that wireless device is in an authorized location within a building.

5. The method of claim 1, wherein the second predetermined range is determined to identify a distance between the AP and the wireless device.

6. The method of claim 1, further comprising:
  refusing, with the AP, the wireless device access to the network through the AP when it is determined that the determined angle of the wireless device is not within the first predetermined range or the received signal strength is not within the second predetermined range.

7. The method of claim 1, further comprising:
  transmitting, with the AP, an alert to a management system when it is determined that the angle of the wireless device is not within the first predetermined range or the received signal strength is not within the second predetermined range.

8. The method of claim 1, wherein granting, with the AP, the wireless device access to a network through the AP is to occur when:
the AP determines that the angle of the wireless device is within the first predetermined range;
the AP determined that the received signal strength is within the second predetermined range; and
the AP determines that the wireless device has been authenticated through a second method.

9. The method of claim 8, wherein the second method is a password-based authentication method.

10. The method of claim 1, wherein the AP and the wireless device are mounted such that the position of the AP and the position of the wireless device are fixed relative to each other.

11. A non-transitory machine readable storage medium having stored thereon machine readable instructions to cause a computer processor to:
receive a request from a wireless device to connect to a network through an Access Point (AP);
determine, based on a beamforming index between the AP and the wireless device, an angle of the wireless device relative to a fixed antenna array of the AP, wherein determining the angle of the wireless device relative to the fixed antenna array includes determining an angle based at least in part on a beamforming index;
determine, based on a received signal strength between the AP and the wireless device, a distance between the AP and the wireless device; and
grant the request only when it is determined that the determined angle of the wireless device relative to the fixed antenna array of the AP is within a first predetermined range and the determined distance between the AP and the wireless device is within a second predetermined range, wherein the second predetermined range is based at least in part on the determined angle of the wireless device relative to the fixed antenna array of the AP, the second determined range being a first range for a determined angle of a first angle value and a second range for a determined angle of a second angle value, wherein the first angle value is greater than the second angle value in relation to an axis for the fixed antenna array, and wherein the first range requires a shorter distance between the AP and the wireless device than the second range;
wherein granting the request comprises wherein granting comprises sending a response to the wireless device, the response comprising a plurality of association information to facilitate allowing the wireless device access to the network through the AP.

12. The non-transitory machine readable storage medium of claim 11, wherein the request to connect to the network through the AP includes access to an external network through the AP.

13. The non-transitory machine readable storage medium of claim 11, wherein the request to connect to the network through the AP includes access to an internal computing system of a vehicle that houses the AP.

14. A vehicle comprising:
a vehicle body;
a computing system secured to the vehicle body;
an Access Point (AP) to allow an authenticated wireless device to wirelessly communicate with the computing system, the AP including:
a processing resource; a fixed antenna array; and a memory resource storing machine readable instructions to cause the processing resource to:
refuse a communication request from the wireless device to access the computing system through the AP when either: the AP determines that an angle of the wireless device relative to the fixed antenna array is not within a first predetermined range, the angle of the wireless device relative to the fixed antenna array being determined via beamforming of the AP, or the AP determines that a distance between the AP and the wireless device is within a second predetermined range, wherein the second predetermined range is based at least in part on the determined angle of the wireless device relative to the fixed antenna array, the second determined range being a first range for a determined angle of a first angle value and a second range for a determined value of a second angle value, wherein the first angle value is greater than the second angle value in relation to an axis for the fixed antenna array, and wherein the first range requires a shorter distance between the AP and the wireless device than the second range; wherein refusing the communication request comprises the AP refusing to transmit a plurality of association information to the wireless device to facilitate allowing the wireless device access to the computing system through the AP.

15. The vehicle of claim 14, wherein the memory resource stores machine readable instructions to cause the processing resource to:
accept a communication request from the wireless device to access the computing system through the AP when the AP determines that the determined angle of the wireless device relative to the fixed antenna array is within the first predetermined range and when the AP determines that the determined distance between the wireless device and the AP is within the second predetermined range.

16. The vehicle of claim 15, wherein the vehicle body defines a passenger space within the vehicle and wherein the AP accepts a communication request from the wireless device to access the computing system through the AP when the AP determines that the wireless device is located within the passenger space based on the determined angle of the wireless device relative to the fixed antenna array and the determined distance between the wireless device and the AP.

17. The vehicle of claim 15, wherein the AP accepts a communication request from the wireless device to access the computing system through the AP when the AP determines that the wireless device is located within an authorized area based on the determined angle of the wireless device relative to the fixed antenna array and the determined distance between the wireless device and the AP.

18. The vehicle of claim 17, wherein the authorized area includes an area that is at least in part outside of the vehicle.

* * * * *